US007832966B2

(12) United States Patent
Shultz et al.

(10) Patent No.: US 7,832,966 B2
(45) Date of Patent: Nov. 16, 2010

(54) DRILL FOR MAKING FLAT BOTTOM HOLE

(75) Inventors: Michael D. Shultz, Bradenville, PA (US); Stephen M. George, Evans, GA (US); Raymond E. Moring, Martinez, GA (US); David L. Ford, Bentonville, AR (US)

(73) Assignee: Kennametal Inc., Latrobe, PA (US)

( * ) Notice: Subject to any disclaimer, the term of this patent is extended or adjusted under 35 U.S.C. 154(b) by 669 days.

(21) Appl. No.: 11/564,112

(22) Filed: Nov. 28, 2006

(65) Prior Publication Data

US 2007/0160437 A1 Jul. 12, 2007

Related U.S. Application Data

(63) Continuation-in-part of application No. 10/354,783, filed on Jan. 30, 2003, now Pat. No. 7,140,815.

(51) Int. Cl.
*B23B 51/02* (2006.01)
(52) U.S. Cl. ............... 408/224; 76/108.6; 451/48; 408/230; 408/225
(58) Field of Classification Search ......... 408/223–225, 408/227–230; 76/108.1, 108.6, 115; 451/48
See application file for complete search history.

(56) References Cited

U.S. PATENT DOCUMENTS 2,400,586 A    5/1946   Zimmermann (Continued)

FOREIGN PATENT DOCUMENTS

DE    216607    11/1909

(Continued)

OTHER PUBLICATIONS

RTW Advertisement, "New High Performance Drill Provides Elevated Productivity," reprinted from Metalworking Digest, Oct. 1994 by Rogers Tool Works, Inc. Rogers, AR, One Page.

*Primary Examiner*—Daniel W Howell
(74) *Attorney, Agent, or Firm*—Larry R. Meenan (57) ABSTRACT

The present invention is directed to a helical drill configuration that allows substantially flat bottomed holes to be machined. At the cutting end of the body member, there are at least two cutting edges that are symmetrically oriented on opposing sides of the rotational axis of the drill. In an embodiment of the invention, first and second cutting edge portions form a continuous surface which provides strength and tool stability. The height of the second portions of each of the cutting edges remains relatively consistent along the horizontal for formation of a generally flat bottom hole. In the embodiment, a center point is defined by two sloped peak surfaces. A central straight chisel edge is formed by the intersection of the two sloped peak surfaces. The first cutting edge section extends from the chisel edge to the second cutting edge section. The first cutting edge section for both cutting edges is formed by symmetrically thinning the two peak surface. In the invention, stress at the center portion of the helical cutting tool is limited by the chisel edge and first sections of the cutting edge near the center portion having a balanced geometry. The balanced geometry of the helical drill also prevents the drill from wobbling and creating deviations in the hole being formed. The chisel edge may blend with a first curvilinear cutting edge and the first curvilinear cutting edge may also have a positive rake to promote cutting.

28 Claims, 10 Drawing Sheets

U.S. PATENT DOCUMENTS

| | | | |
|---|---|---|---|
| 2,600,286 A | 9/1947 | Weiland | |
| 2,778,252 A * | 1/1957 | Oxford, Jr. | 408/230 |
| 3,387,511 A | 6/1968 | Ackart et al. | |
| 3,564,947 A | 2/1971 | Maier | |
| 3,788,409 A | 1/1974 | Curington | |
| 4,116,580 A | 9/1978 | Hall et al. | |
| 4,222,690 A | 9/1980 | Hosoi | |
| 4,488,840 A | 12/1984 | Pollington | |
| 4,565,473 A | 1/1986 | Hosoi | |
| 4,583,888 A * | 4/1986 | Mori et al. | 408/59 |
| 4,605,347 A * | 8/1986 | Jodock et al. | 408/224 |
| 4,620,822 A | 11/1986 | Haque et al. | |
| 4,688,972 A | 8/1987 | Kubota | |
| 4,744,705 A | 5/1988 | Imanaga | |
| 4,826,368 A * | 5/1989 | Tikal et al. | 408/225 |
| 4,878,788 A | 11/1989 | Wakihira et al. | |
| 4,893,968 A | 1/1990 | Levy | |
| 4,898,503 A | 2/1990 | Barish | |
| 4,968,193 A | 11/1990 | Chaconas et al. | |
| 4,983,079 A * | 1/1991 | Imanaga et al. | 408/230 |
| 5,037,251 A | 8/1991 | Roth | |
| 5,141,369 A | 8/1992 | Palace | |
| 5,273,380 A | 12/1993 | Musacchia | |
| 5,288,183 A | 2/1994 | Chaconas et al. | |
| 5,338,135 A | 8/1994 | Noguchi et al. | |
| 5,350,261 A | 9/1994 | Takaya et al. | |
| 5,423,640 A | 6/1995 | Lindblom et al. | |
| 5,486,075 A | 1/1996 | Nakamura et al. | |
| 5,626,446 A | 5/1997 | Ching | |
| 5,700,113 A | 12/1997 | Stone et al. | |
| 5,716,172 A | 2/1998 | Nakamura et al. | |
| 5,904,455 A | 5/1999 | Krenzer et al. | |
| 6,132,149 A | 10/2000 | Howarth | |
| 6,135,681 A | 10/2000 | Nuzzi et al. | |
| 6,190,097 B1 | 2/2001 | Thomas | |
| 6,261,034 B1 | 7/2001 | Cselle | |
| 6,270,298 B1 | 8/2001 | Colvin | |
| 6,312,432 B1 | 11/2001 | Leppelmeier | |
| 6,315,505 B1 | 11/2001 | Moore | |
| 6,443,674 B1 | 9/2002 | Jaconi | |
| D477,515 S | 7/2003 | Winivis | |
| 6,585,460 B1 * | 7/2003 | Meece et al. | 408/230 |
| 6,739,809 B2 | 5/2004 | Shaffer | |
| 6,988,859 B2 | 1/2006 | Borschert et al. | |
| 7,140,815 B2 * | 11/2006 | George et al. | 408/230 |
| 7,422,396 B2 | 9/2008 | Takikawa | |
| 2003/0175085 A1 | 9/2003 | Prokop | |
| 2004/0018064 A1 | 1/2004 | Liu | |
| 2004/0151553 A1 | 8/2004 | George et al. | |
| 2005/0053438 A1 | 3/2005 | Wetzel et al. | |
| 2005/0249562 A1 | 11/2005 | Frejd | |
| 2006/0056930 A1 | 3/2006 | Rompel | |

FOREIGN PATENT DOCUMENTS

| | | | |
|---|---|---|---|
| DE | 1177904 B | | 9/1964 |
| DE | 3316193 | | 11/1984 |
| DE | 3624617 A1 | | 1/1988 |
| DE | 3628262 A1 | | 1/1988 |
| DE | 4026603 | | 4/1991 |
| DE | 4307553 A1 | | 9/1993 |
| DE | 4312265 | | 10/1993 |
| DE | 4417166 A1 | | 2/1995 |
| DE | 4435857 A1 | | 4/1996 |
| DE | 29609017 U1 | | 7/1996 |
| DE | 19602566 A1 * | | 7/1997 |
| DE | 20209767 U1 | | 11/2003 |
| DE | 10337985 A1 | | 3/2005 |
| DE | 69927417 T2 | | 6/2006 |
| EP | 0088037 | | 1/1983 |
| EP | 0089123 A1 | | 9/1983 |
| EP | 0127322 A1 | | 12/1984 |
| EP | 0137898 A1 | | 4/1985 |
| EP | 0508468 A1 | | 10/1992 |
| EP | 0890404 | | 1/1999 |
| FR | 725363 | | 5/1932 |
| JP | 58160009 A * | | 9/1983 |
| JP | 59076709 A | | 5/1984 |
| JP | 59161208 | | 9/1984 |
| JP | 63093520 | | 4/1988 |
| JP | 01140908 | | 6/1989 |
| JP | 04025308 A * | | 1/1992 |
| JP | 2006088267 A | | 4/2006 |
| WO | 9842469 A1 | | 10/1998 |

* cited by examiner

DRILL FOR MAKING FLAT BOTTOM HOLE

CROSS REFERENCE TO RELATED APPLICATIONS

This application is a continuation-in-part of U.S. application Ser. No. 10/354,783 filed Jan. 30, 2003, which has issued as U.S. Pat. No. 7,140,815.

BACKGROUND OF THE INVENTION

1. Field of the Invention

The invention relates to a tool for creating a flat bottom hole into a stock material.

2. Background

For many applications, it may be desirable to form a hole in a work piece substrate which terminates in a flat bottom surface. Many types of cutting tools and drilling systems have been developed for creating holes having flat bottoms.

Some cutting tools in the prior art utilize one type of drill for starting such a hole, and then using a second metal cutting tool to produce the desired flat bottom in the hole.

Prior art cutting tools that were designed to cut flat bottomed holes have various deficiencies. Some flat bottomed hole drills had cutting edge designs that could form a flat bottom hole, but these drill configurations resulted in a weakened area, point or line where these prior art drills would occasionally break or fracture. In other prior art flat bottom cutting drills, the drills were configured such that chips from the drilling process were not formed efficiently, causing excessive wear and chip control problems. Additionally, the nature of these cutting edges resulted in high cutting forces, specifically in thrust.

SUMMARY OF THE INVENTION

The present invention is directed to a helical drill configuration that allows substantially flat bottomed holes to be machined. The drills of the invention comprise an elongated body member having a longitudinal axis, a forward fluted portion with a cutting end and a rearward cylindrical shank portion for mounting to rotating machinery. The helical drill is configured to be rotationally driven about the longitudinal axis or to have the workpiece rotate, or both the body member and workpiece rotate relative to each other. At the cutting end of the body member, there are at least two cutting edges that are symmetrically oriented on opposing sides of the rotational axis of the drill. Each edge has at least a first and second cutting edge portion, with the first cutting edge portion extending radially from a position adjacent the longitudinal or rotational axis of the body to a second cutting edge portion, and the second cutting edge portion extending radially outward to at least approximately near the margin on the external radial circumference of the drill.

In one embodiment of the invention, the first and second cutting edge portions form a continuous surface which provides strength and tool stability. The height of the second cutting edge portions of each of the cutting edges remains relatively consistent along the horizontal for the formation of a generally flat bottom hole. In the embodiment, a center point is defined by two sloped peak surfaces. A central straight chisel edge is formed by the intersection of the two sloped surfaces. The first cutting edge portion extends from the chisel edge to the second cutting edge portion. The peak surfaces are oriented at an angle gamma with respect to the horizontal. The central pointed portion of the drill forms a centrally located conical recess in the bottom wall of the hole.

In the invention, stress at the center portion of the helical cutting tool is limited by the chisel edge and first portion of the cutting edge near the center portion having a balanced geometry. The balanced geometry of the helical drill also prevents the drill from wobbling and creating deviations in the hole being formed.

Flutes are formed in association with the first and second cutting edges for removal of chips of material cut by the cutting edges. The flutes may be formed with a positive rake to facilitate chip formation. Alternatively, the flute may have a variable rake surface, wherein the rake surface of the cutting edge portion adjacent the central axis is negative and positive toward the most radially outward portion of the cutting edge near the drills outer circumference. The rake of the cutting edge portions, it is contemplated, could be angled along the length of the cutting edges in accordance with what is well known in the art. Optionally, chip breakers such as notches can be cut into the cutting surface edges of the flat bottom tool drill to allow for better chip control in certain material groups, as well known in the art.

In another embodiment of the invention, the cutting edges adjacent to the chisel edge are curvilinear and the chisel edge blends with the adjacent cutting edges.

In another embodiment, the chisel edge is split by an imaginary bisector line and the rake angle of the cutting edges adjacent to the chisel edge on each side of the bisector line is positive.

In yet another embodiment, the length of the chisel edge is very short relative to the cutting tool external diameter to provide stability to the cutting tool as it enters the workpiece.

It is an object of the present invention to provide a drill that can be made in a cost effective manner and that can cut flat bottomed holes efficiently and with precision.

These and other objects and advantages of the invention, as well as the details of illustrative embodiments, will be more fully understood from the following specification and drawings.

DETAILED DESCRIPTION OF THE INVENTION

Figure 2:
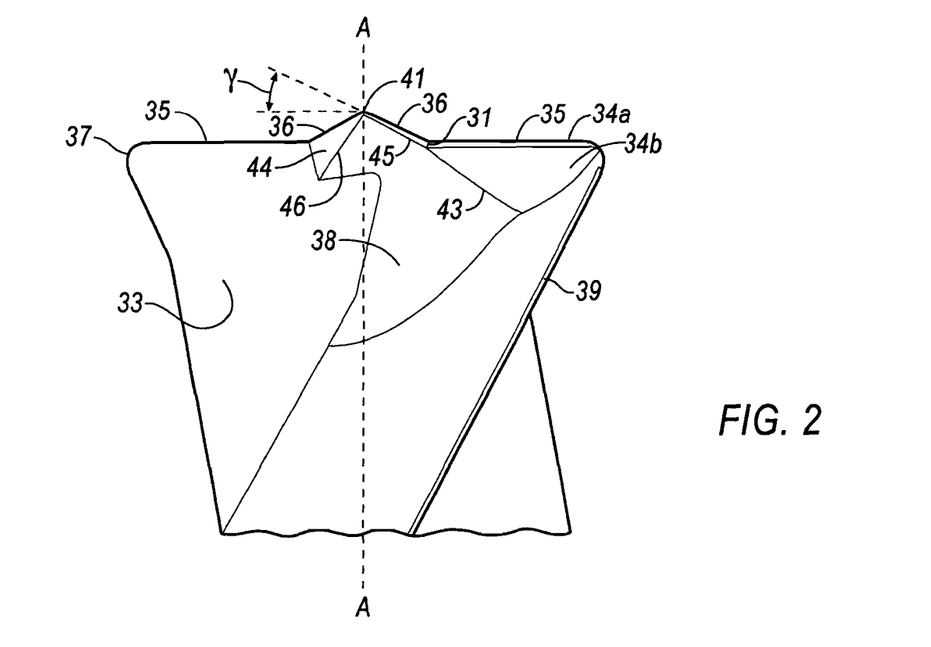
FIG. 2 is a side view taken along a line generally perpendicular and within the same horizontal plane as the primary cutting edge and second cutting edge portions of the cutting end of a helical drill of the present invention.

The helical drill of the invention comprises an elongated body, generally cylindrical, having a longitudinal axis, a forward fluted portion with a cutting end and a rearward cylindrical shank portion (not shown) for mounting to rotating machinery, as well known in the art. FIG. 2 illustrates the forward cutting end of the drill invention having a drill main body formed of a hard material, such as a high-speed steel, cemented carbide, or the like, and formed generally as a rod shape having a longitudinal central axis A-A.

Figure 1:
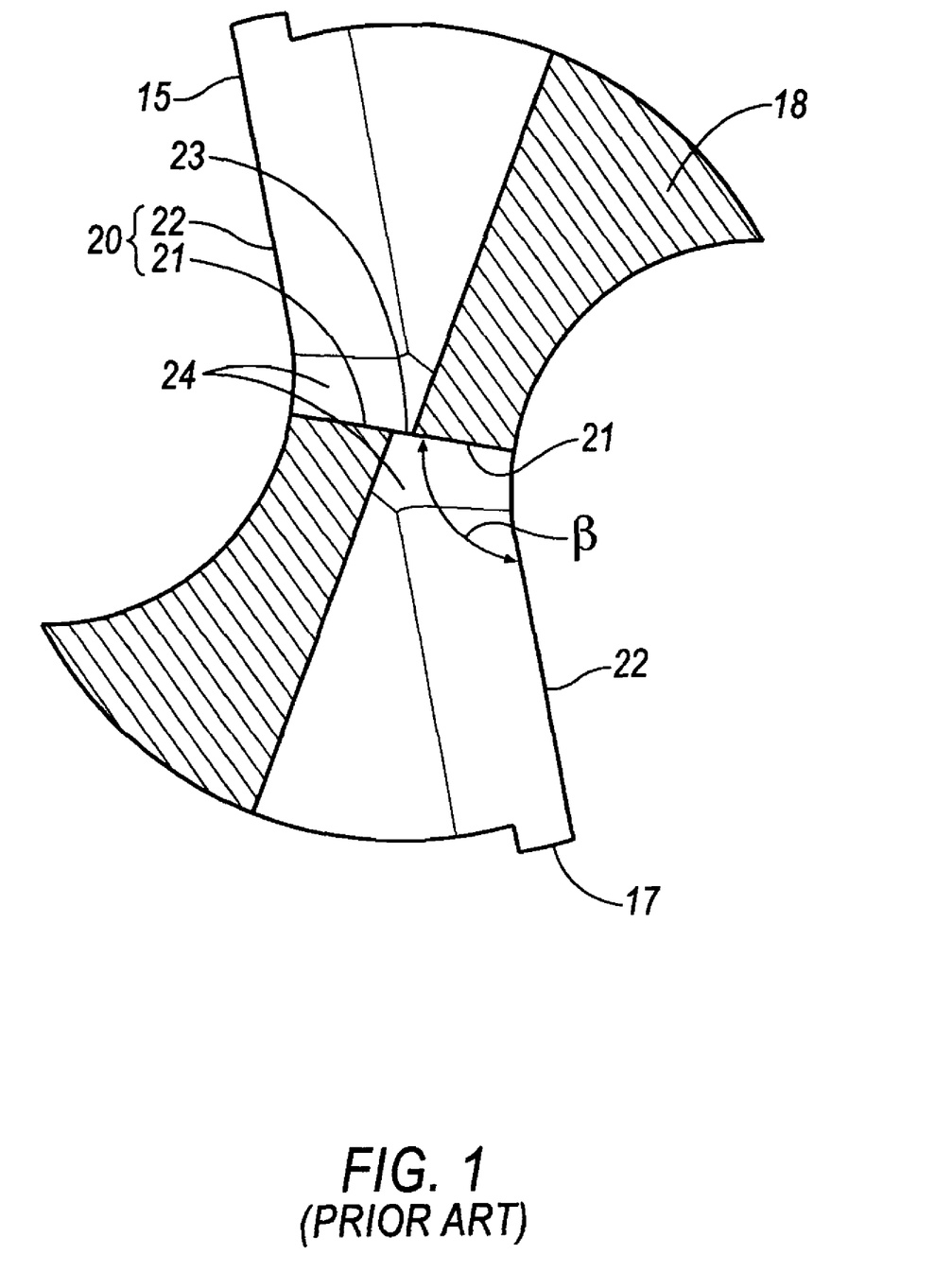
FIG. 1 is a top view of the cutting end of a prior art helical drill for cutting a flat bottom hole.

A prior art drill for forming flat bottom holes is illustrated in FIG. 1. In such prior art flat bottom drills, the cutting edges 20, 20 are linear and extend horizontally outward in the radial direction to the margin 17 at the external circumferential edge of the drill. The prior art flat bottom drills have a central point formed by two peak surfaces 24 sloped upward from the horizontal. The upwardly sloped peak surfaces 24 intersect at and adjacent to the longitudinal central axis of the drill to form a chisel edge 23. The cross-hatched lines in FIG. 1 represent a second thinning surface 18 formed by a grinding wheel during the manufacture of the helical drill. A first thinning surface runs parallel to the central axis of the drill and, therefore, is not represented in FIG. 1. The first thinning surface is a flat planar surface that extends rearwardly and generally parallel to the central axis until it intersects the second thinning surface 18. The edge formed by an intersection of the peak surface 24 and the first thinning surface defines the first inward portion 21 of the cutting edge. The cutting edges 20, 20 include the first inward cutting edge portion 21 that extends from the chisel edge 23 to a second cutting edge portion 22. The second portion 22 of the cutting edge is linear and extends from an intersection with the first inward portion 21 of the cutting edge outward to the outer circumference of the drill 17. The first portion 21 of the cutting edge is oriented at an angle beta (β) with respect to the second portion 22 of the cutting edge when viewed along a top view taken along the central axis. The angle beta (β) in the prior art is typically within the range of 140 degrees to 170 degrees. The intersection between the first cutting edge portion 21 and the second cutting edge portion 22 is readily discernable as a sharp edge.

Figure 3:
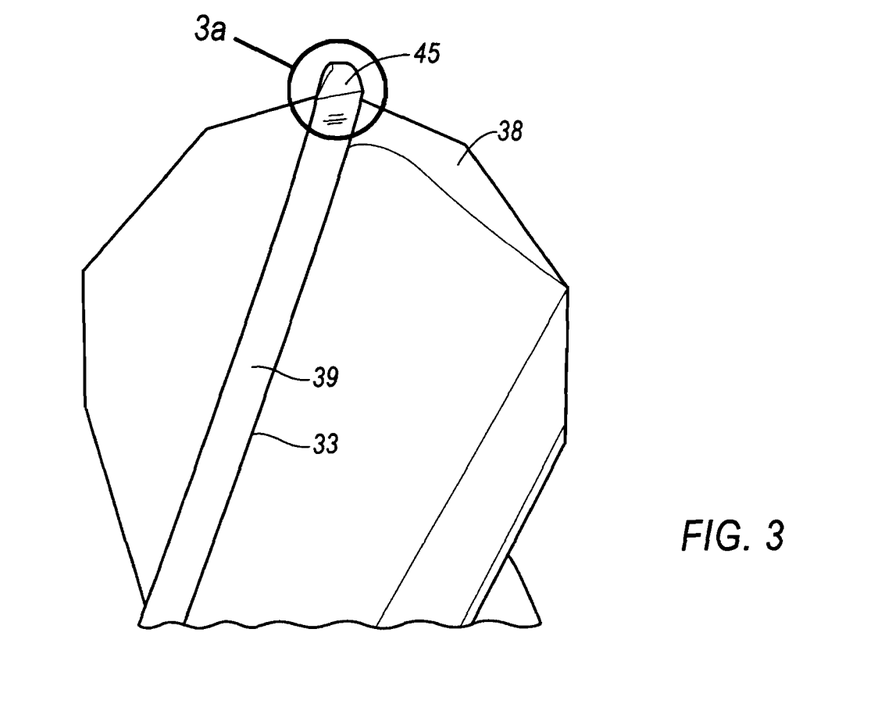
FIG. 3 is a second side view of the drill shown in FIG. 2, taken along a line parallel to the primary cutting edge and within the same horizontal plane of the primary cutting edge of the helical drill.
Figure 3A:
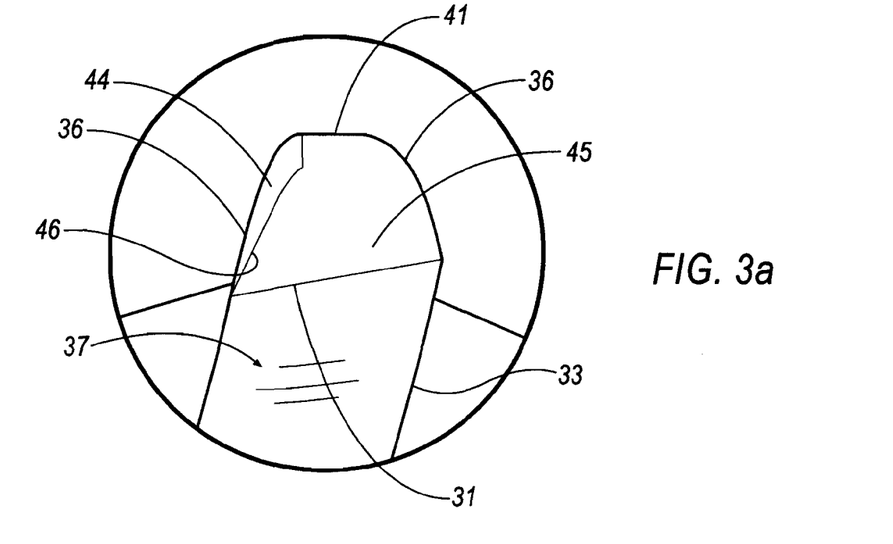
FIG. 3a is a magnified detailed view of the most forward tip portion of the helical drill shown in FIG. 3.
Figure 4:
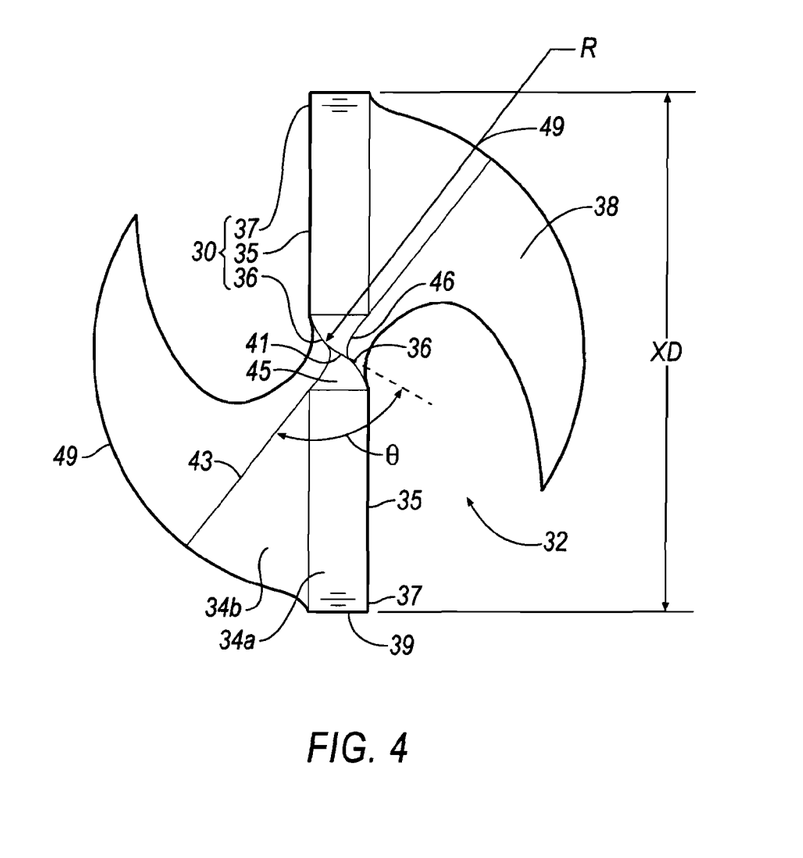
FIG. 4 is a top view of the cutting end of the flat bottom drill shown in FIG. 2.

The helical drill of the present invention, for which one embodiment is shown in FIGS. 2-4, is configured to be rotationally driven about the longitudinal axis A-A or to have the workpiece rotate, or both the body member and workpiece rotate relative to each other. The main body of the drill is arranged such that a cutting end is formed at the outer end of a shank and with two chip discharge flutes 32, 32. The flutes 32 are formed from the tip of the cutting end and extend rearward to adjacent the fastening shank portion of the drill. The flutes 32, 32 are symmetric and at equal intervals in the circumferential and axial direction, and a pair of symmetric cutting edges 30, 30 are formed along the intersecting ridge where forward flute wall surfaces 33, 33 intersect with the top flank 34. Top flank 34 is symmetric and has forward surface sections 34a and rearward surface sections 34b on opposing sides of the drill. The cutting edges 30, 30 are similarly symmetrical with respect to the drill rotational and central axis A-A. The first cutting edge portion 36 extends radially inward toward a straight line chisel ridge 41. The straight chisel edge 41 is formed by intersecting peak surfaces 45.

Each cutting edge has at least a curvilinear first cutting edge portion 36 and a straight second cutting edge portion 35, with the curvilinear first cutting edge portion 36 extending radially from the central straight chisel edge 41 to the straight second cutting edge portion 35, and the second cutting edge portion 35 extending radially outward to at least approximately near the outer margin 39 on the external radial circumference of the drill. The second straight portion 35 extends radially outward to a third outer cutting edge portion 37. The third outer cutting edge portion 37 extends radially outward from the second straight portion 35 to the drill margin 39 and axially rearward. The second straight portion 35, when viewed from the side as in FIG. 2, is perpendicular to the central axis A-A and is an important feature for making a flat bottom hole. The length of the chisel edge 41 in comparison to the diameter of the drill is designed to be approximately between 1%-10% of the drill's diameter.

The above described symmetric design of the cutting edges 30, 30 greatly facilitates stability in use of the drilling system. This characteristic is achieved by the neutral or balanced geometry of the cutting surfaces, which significantly decrease any tendency of the drilling system to wobble in use.

The top flank surface forward sections 34a immediately adjacent all portions of the cutting edge 30 are oriented at a first relief angle as well known in the art of between 5 degrees and 20 degrees, or about 10 degrees. Top flank surface rearward sections 34b are oriented at a greater second relief angle than the top flank forward sections 34a. Top flank rearward surface sections 34b are oriented at a second relief angle of between 20 degrees to 50 degrees, 25 degrees to 40 degrees, or at about 30 degrees. In the illustrated embodiment, first cutting edge portion 36 is convex and has a generally constant radius of curvature "R" when taken from a top view along the central axis, as seen in FIG. 4. The convex curve representing the first cutting edge portion 36 in FIG. 4 has a radius of curvature R set to the range of from eight 8% of the external diameter of the drill, XD, to twenty 20% of the XD when viewed from a top view taken along the central axis of the drill. The radius of curvature "R" is critical to the operation/life/function of the tool. The radius, R, eliminates the sharp transition between cutting edges, so that the breakage of the cutting edge can be securely prevented regardless of drilling conditions. It is contemplated that, alternatively, the first cutting edge portion may be other convex curvilinear geometries than a convex shape having a generally constant radius.

The drill is shaped by thinning at the cutting end of the drill. The thinning is applied to a thick central core portion at the tip of the drill main body and a curvilinear first cutting edge portion 36 is formed by the thinning, the first cutting edge portion 36 extends from the central chisel edge 41 to the straight second cutting edge portion 35. Note, in this embodiment, the first cutting edge portion 36 does not stretch to the center of the drill. The first portion 36 of the cutting edge is formed at a position slightly spaced apart from the central axis of the drill to reduce weakening of the center of the drill caused by stress concentration.

The thinning surfaces on the drill tip of the present invention shown in FIGS. 2-4 reaches from the central core of the drill to the sidewall 49 of the drill. The first thinning surface 38 extends from the rear side of the chip discharge flute 32 to the top flank rearward surface 34b when viewed from a top view taken along the central axis of the drill, FIG. 4. In an embodiment of the invention, illustrated in FIGS. 2-4, the thinning surface 38 is disposed to stretch from the external circumferential sidewall 49 to the central core of the drill near the central axis of the drill.

Each thinning on opposite sides of the central axis is composed of two thinning surfaces, first thinning surface 38 and second thinning surface 44; as seen in FIG. 2, the second thinning surface 44 runs basically parallel to the central axis of the drill. It is contemplated, in an alternative embodiment of the invention, that the second thinning surface 44 may be slightly angled forward or rearward with respect to the cutting direction of the drill to provide a negative or positive rake. The first cutting edge portion 36 is formed along the intersecting ridge where the second thinning surface 44 intersects with the peak surface 45. The first thinning surface 44 extends generally downward to a crease 46 formed with second thinning surface 38. The first thinning surface 44 is not a flat plane but is a convex surface as best represented by line 36 in FIG. 4 (note, line 36 represents the cutting edge portion formed where the first thinning surface 44 intersects with the peak surfaces 45).

The second thinning surface 38 is flat and planar. The flat planar surface of the second thinning 38 is oriented at a constant rearward angle phi, $\phi$, with respect to a plane intersecting the central axis A-A of the drill. In one embodiment of the invention, the plane interesting the longitudinal axis A-A is also parallel to the second cutting edge portion 35, although this central axis intersecting plane need not be parallel to the second cutting edge portions 35. The second thinning surface 38 is sloped rearward at an angle phi, $\phi$, between 30 and 50 degrees, alternatively, between 40 degrees to 45 degrees, or may be about 45 degrees. It should be appreciated that the second thinning surface 38 may be shaped other than flat and planar.

A flank edge 43 represents an upper boundary of the thinning. This is the position of first contact between the grinding wheel and the drill during the grinding process. The flank edge 43 is defined as the intersection between the second thinning surface 38 and the top flank rearward surface section 34b. The flank edge 43 is oriented at an angle theta, $\theta$, with respect to the chisel edge 41, see FIG. 4. The angle theta, $\theta$, is set between the range of from 75 degrees to 105 degrees, or within the range 85 degrees to 95 degrees or at about 90 degrees (as shown).

In a cutting geometry of the invention, the opposed nature of the symmetric top flank surfaces and associated cutting edges 30, 30 can create a significant problem to the desired formation of a flat bottomed hole. To form a truly flat bottomed hole, the height of cutting edges 30, 30 must remain constant all the way to the center axis A-A. If either of the opposing symmetric top flank surfaces 34a, 34b on either side of the drill that defines the cutting edge 30 is extended beyond the rotational axis A-A, it should be evident that such a portion of either of these flank surfaces would oppose rotation of the drill at the location where such a flank surface extends beyond the central axis A-A.

In the present invention, this problem is overcome by the formation of slight upwardly inclined opposing peak surfaces 45. The peak surfaces 45 extend from near the central axis A-A generally radially outward and rearward. The base of each peak surface 45 intersects with top flank forward section 34a at line 31. An upwardly inclined peak surface 45 is associated with each of the top flank surfaces 34a, 34a and cutting edges 30, 30. In FIG. 2, the first cutting edge portion 36 associated with peak surface 45 is shown, angle gamma, $\gamma$, represents the angle of inclination of the peak surface 45 and associated first cutting edge portion 36 relative to the second straight portion 35 of the cutting edge (the horizontal). The cutting edge 30 on one side of the rotational axis is symmetric with the cutting edge 30 on the opposite side of the rotational axis A-A. In the present embodiment, the peak surfaces 45 are oriented at the same angle gamma, $\gamma$, with respect to the horizontal (straight second cutting edge portion 35 shown in FIG. 2). The angle gamma, $\gamma$, is within the range of between 10 degrees and 25 degrees, alternatively 25 degrees to 45 degrees or about 15 degrees.

As shown in FIG. 2, and as described above, the invention has a small drill point near the central portion of the drill. Creating a small center point or drill point at the center of the flat bottom hole improves the stability and strength of the tool. By increasing the angle gamma, $\gamma$, of this pointed portion, the start up, stability and reduction in wobbling of the drill may be improved as desired by configuring the angle gamma, $\gamma$, as required for various applications. Increasing gamma, $\gamma$, generally improves the start up, stability and wobble reduction of the drill but also weakens the peaked tip of the drill.

The design of the central core portion of the invention as described above provides that both of the cutting edges 30, 30 are substantially continuous with the straight chisel edge 41. The cutting edge portions 36, 36, along with the chisel edge of the invention, generally cut out the hole geometry rather than having the central portion of the hole being removed undesirably by grinding as in prior art drills.

Another significant benefit of the cutting geometry associated with the drilling system and drill insert according to the present invention is found in the relative ease of manufacture. In the embodiment of the invention, the thinning surfaces 38, 44 can be formed by a one step grinding process using a grinding wheel. The thinning surface depicted by the cross-hatched section of the cutting end of the prior art drill illustrated in FIG. 1 is formed by a "one-step" linear grind using a typical grinding wheel well known in the art. The thinning surface of the invention is made by a compound "one-step" grind beginning with an initial rearward sloping linear grind continuing immediately into a curvilinear rearward grind directed away from the central axis of the drill.

As can be appreciated, the cutting geometry disclosed above allows for a reduction in the length of the chisel edge without compromising the effectiveness of the tool. Since the chisel edge is not a true cutting edge, it grinds and extrudes rather than cuts material. The geometry disclosed replaces the majority of the chisel edge with a cutting edge, thereby greatly reducing the thrust needed to drill properly.

The third outer cutting edge portion 37 as shown in FIG. 2 may be curvilinear and have a constant radius of rotation. Such a drill design as illustrated in FIG. 2 would result in machining a bore hole having a rounded corner. It is contemplated that the third outer cutting edge portion 37 may instead be chamfered so that the drill bore holes have a bottom surface with a chamfered rim about its circumference. It is also contemplated that another embodiment of the drill might not have a third outer cutting edge portion 37, but may consist of only a first cutting edge portion 36 and a second straight horizontal cutting edge portion 35 that extends radially outward from the first cutting edge portion 36 to the extreme margin 37 of the drill forming a sharp corner thereat.

A chisel edge 41 having a straight configuration with a first curvilinear cutting edge portion 36 adjacent thereto provides additional efficiency in the cutting operation.

With respect to FIGS. 5-12, wherein the second embodiment of the subject invention will be discussed, it should be appreciated that like parts of the previously discussed drill will retain the same reference item numbers and these parts will not again be discussed at length.

Figure 5:
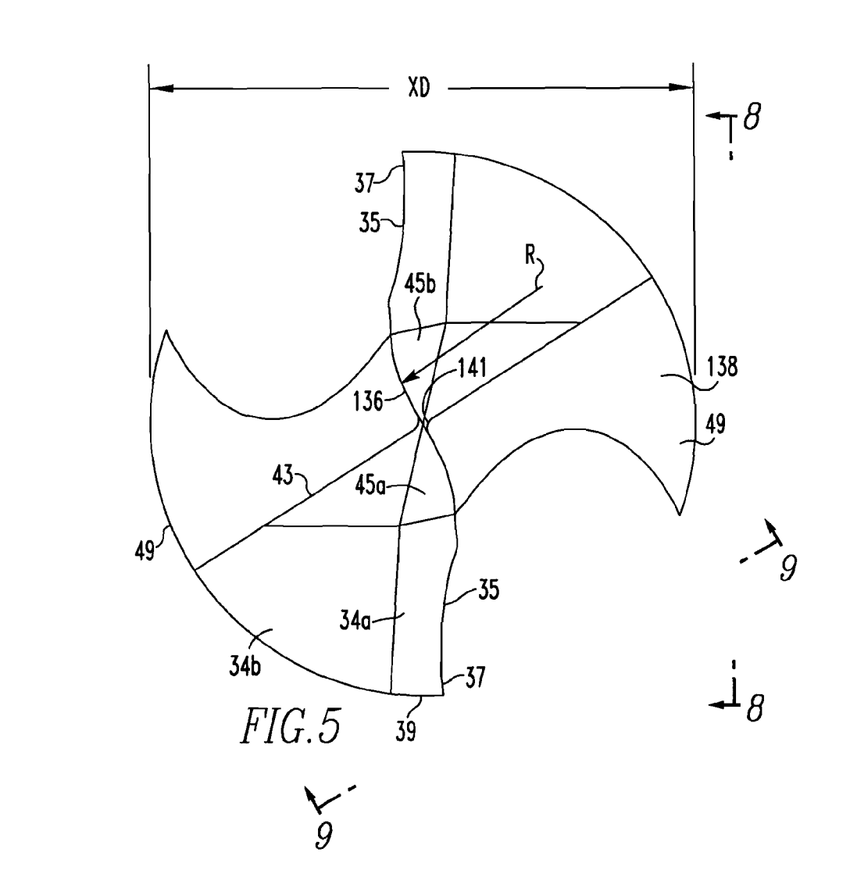
FIG. 5 is a top view of the cutting end of a flat bottom drill in accordance with a second embodiment of the subject invention.

Of particular note, FIG. 5 is a view similar to that of previously presented FIG. 4, but the chisel edge 141 is much shorter than relative to the tool external diameter than the chisel edge 41 previously discussed. The enlarged view of FIG. 5 found in FIG. 6 highlights this feature. Additionally, as will be discussed, the first curvilinear cutting edge portion 136 has a positive axial rake angle.

Figure 6:
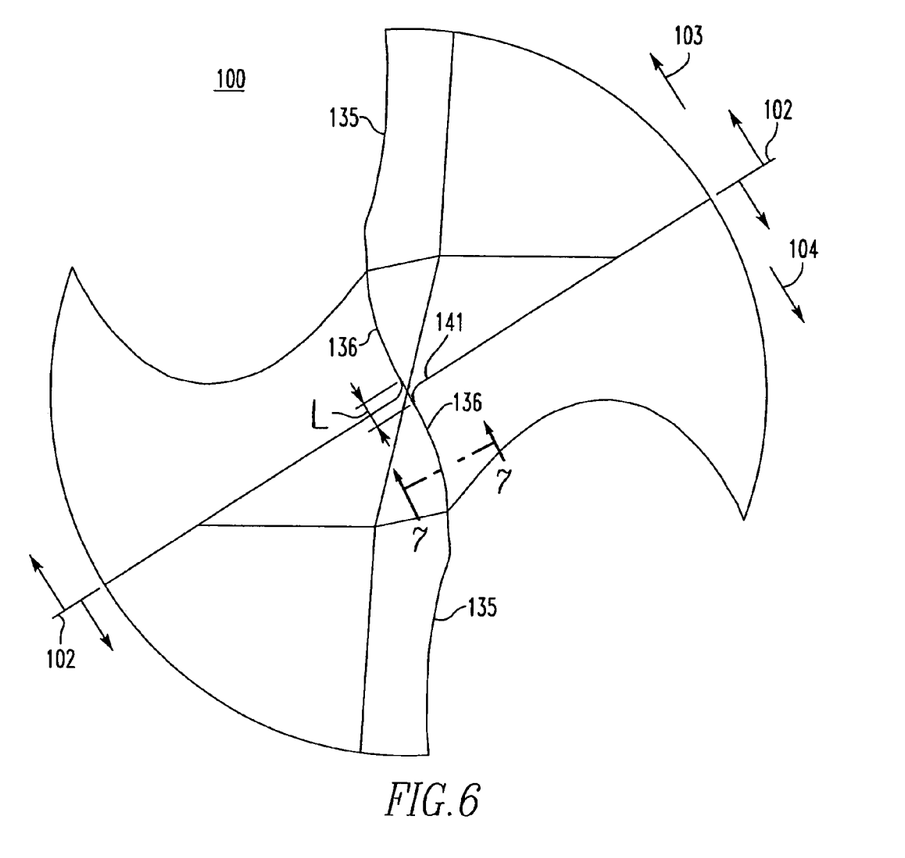
FIG. 6 is an enlarged view of the top view illustrated in FIG. 5.
Figure 7:
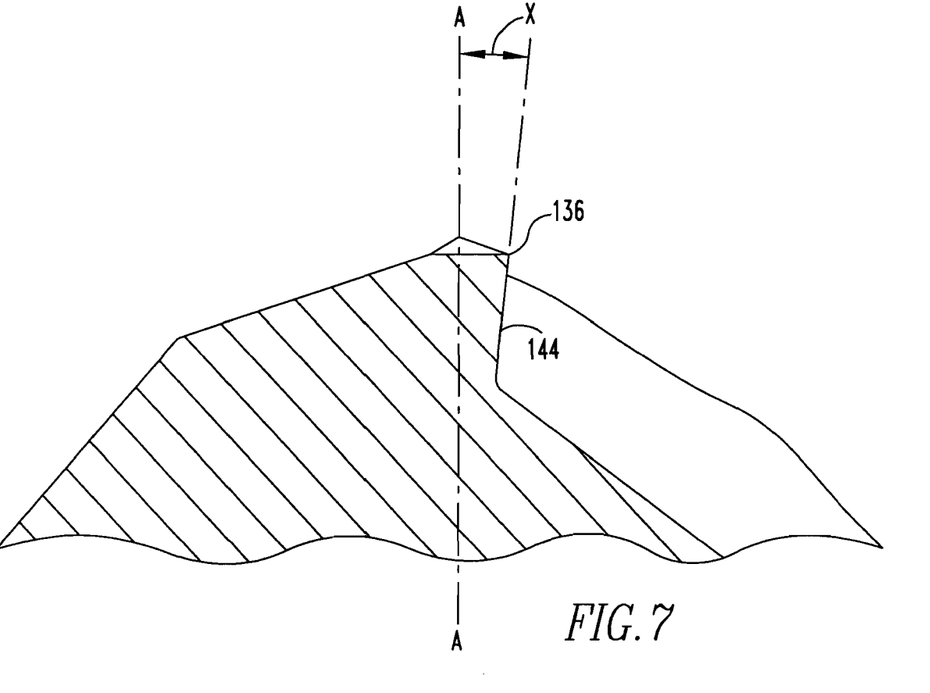
FIG. 7 is a partial cross-sectional view taken along arrows "7-7" in FIG. 5.
Figure 8:
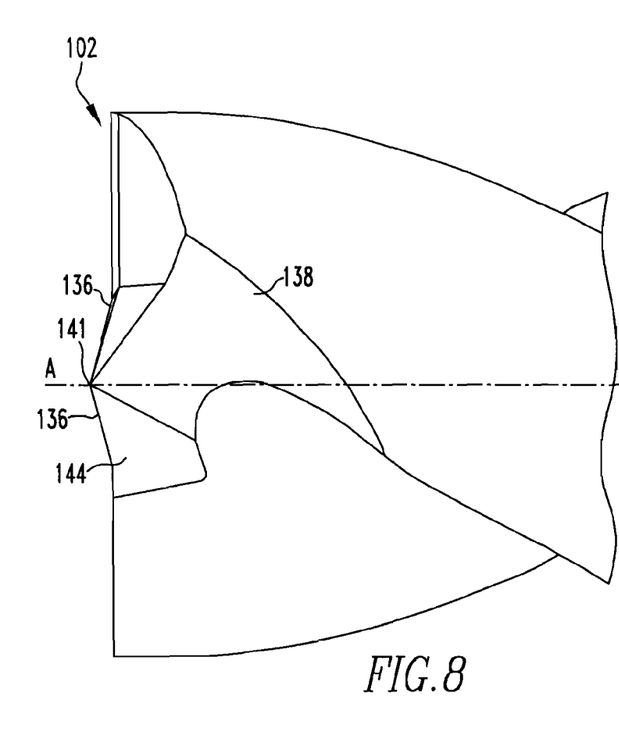
FIG. 8 is a side view of the drill illustrated in FIG. 5 taken along arrows "8-8" in FIG. 5.

The generally cylindrical cutting tool 100 has a longitudinal axis A-A (FIG. 8) which in FIG. 6 is the center of the cylindrical cutting tool 100. A first peak surface 45a and a second peak surface 45b, intersect at and are generally adjacent to the central axis A-A and intersect to form the chisel edge 141. An imaginary bisector line 102 extends radially through the central axis AA perpendicular to the chisel edge 141 and defines a first tool half 103 on one side of the bisector line 102 and a second half 104 on the other side of the bisector line 102.

Each tool half 103, 104 has a first curvilinear cutting edge portion 136 extending radially from the chisel edge 141 and a second cutting edge portion 135 extending radially outwardly from the first cutting edge portion 136. When viewed from the cutting end 102 (FIG. 8) the chisel edge 141 is curved to blend with the first curvilinear cutting edge 136 of the first tool half 103 and the first curvilinear cutting edge 136 of the second tool half 104. It should be appreciated when viewing FIG. 6 that the chisel edge 141 blends smoothly with the first curvilinear cutting edge 136 of the first tool half 103 and the first curvilinear cutting edge 136 of the second tool half 104 to provide a continuous "s" shaped connector between each of the first curvilinear cutting edges.

Of particular interest in the subject invention is the fact that the first curvilinear cutting edge portion 136 adjacent to the chisel edge 141 of each tool half 103, 104 each have adjacent surfaces which define a positive axial rake angle. In particular, the second thinning surface 144 serves as the rake face for the first curvilinear cutting portion 136. It should be appreciated that the positive axial rake angle X between the second thinning surface 144 and the central axis AA may be between 1-15 degrees and preferable is 5 degrees.

Additionally, the length L of the chisel edge 141 is short relative to the external diameter XD of the cutting tool 200. In particular, the length L of the chisel edge 141 may be between 1% and 4%, preferably 2.5%, of the external diameter XD of the cutting tool 100.

FIG. 5 illustrates a radius of curvature R of the first curvilinear cutting edge 136 and this radius of curvature R may be between about 8% to 20% of the tool 200 external diameter XD. As previously mentioned and with respect to FIG. 6, the chisel edge 141 is curved to blend with the first curvilinear cutting edge portion 136 of both the first tool half 103 and the second tool half 104. As a result, the chisel edge 141 and the adjacent first curvilinear cutting edge portion 136 itself assumes an "s" shape. This "s" shape, along with the positive axial rake angle X of the first curvilinear cutting edge portion 136 provides an enhanced ability to center the cutting tool and also provides additional stability to the cutting tool.

Figure 9:
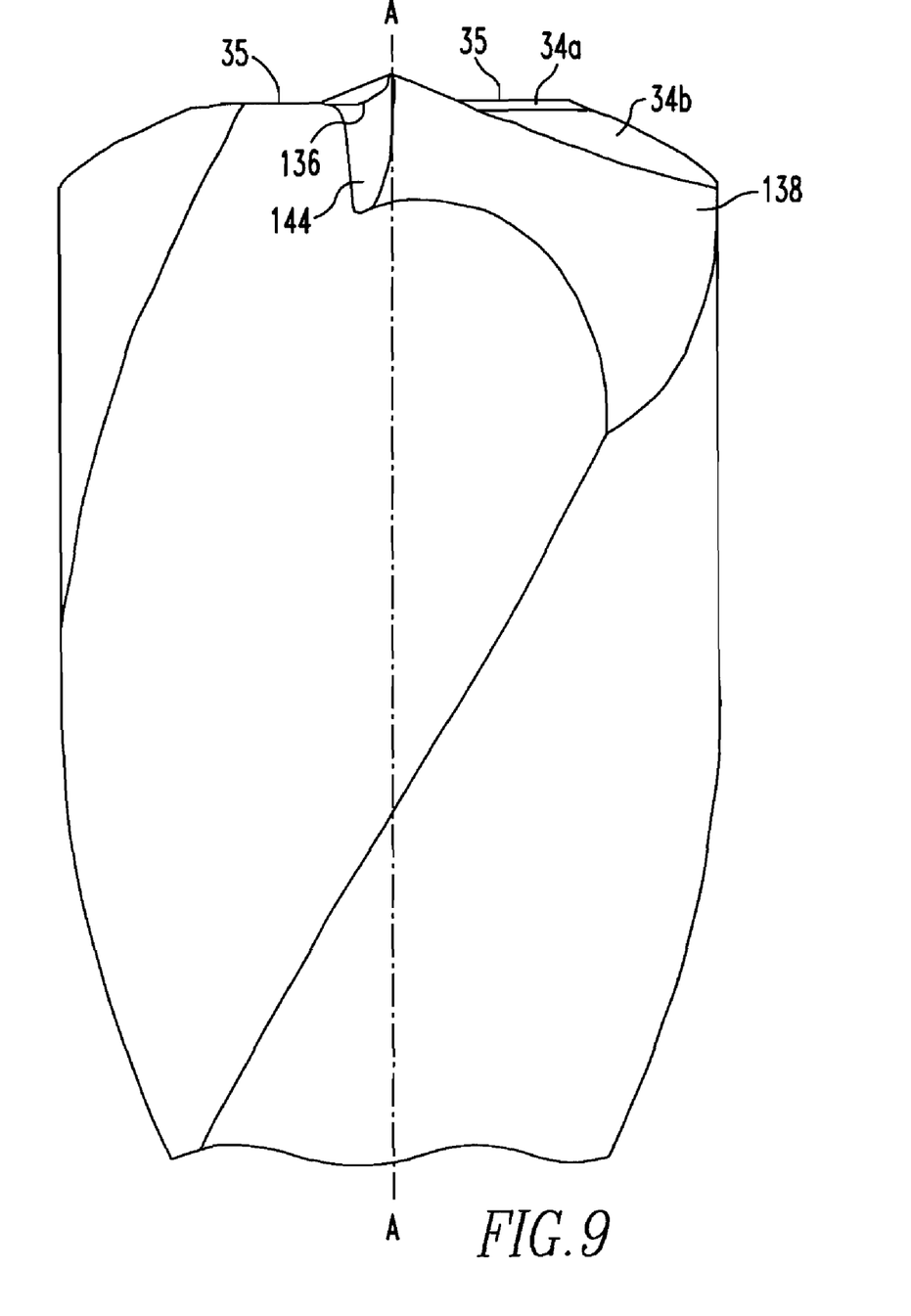
FIG. 9 is a side view taken along arrows "9-9" in FIG. 5.
Figure 10:
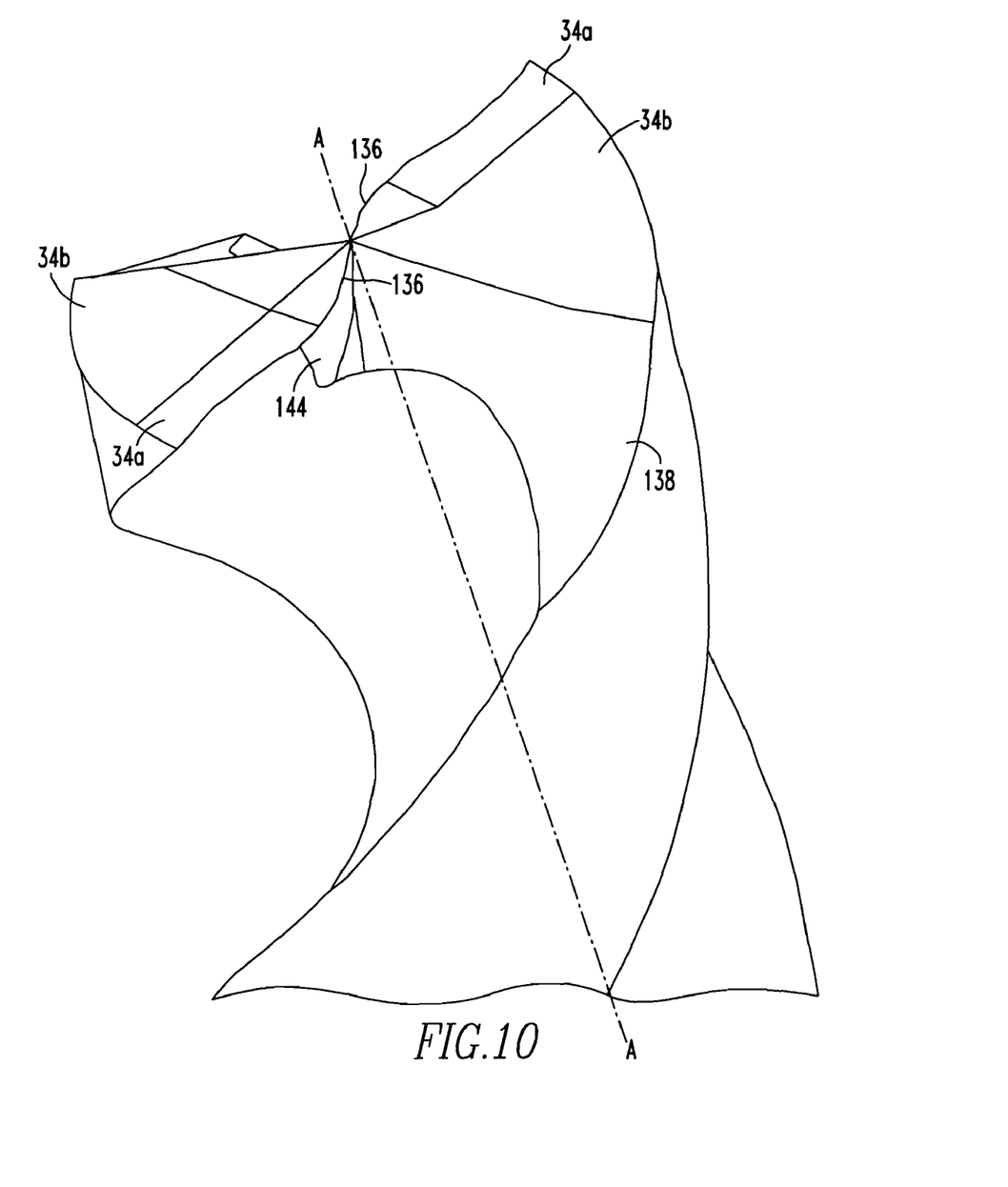
FIG. 10 is a perspective view of the tool illustrated in FIG. 5.
Figure 11:
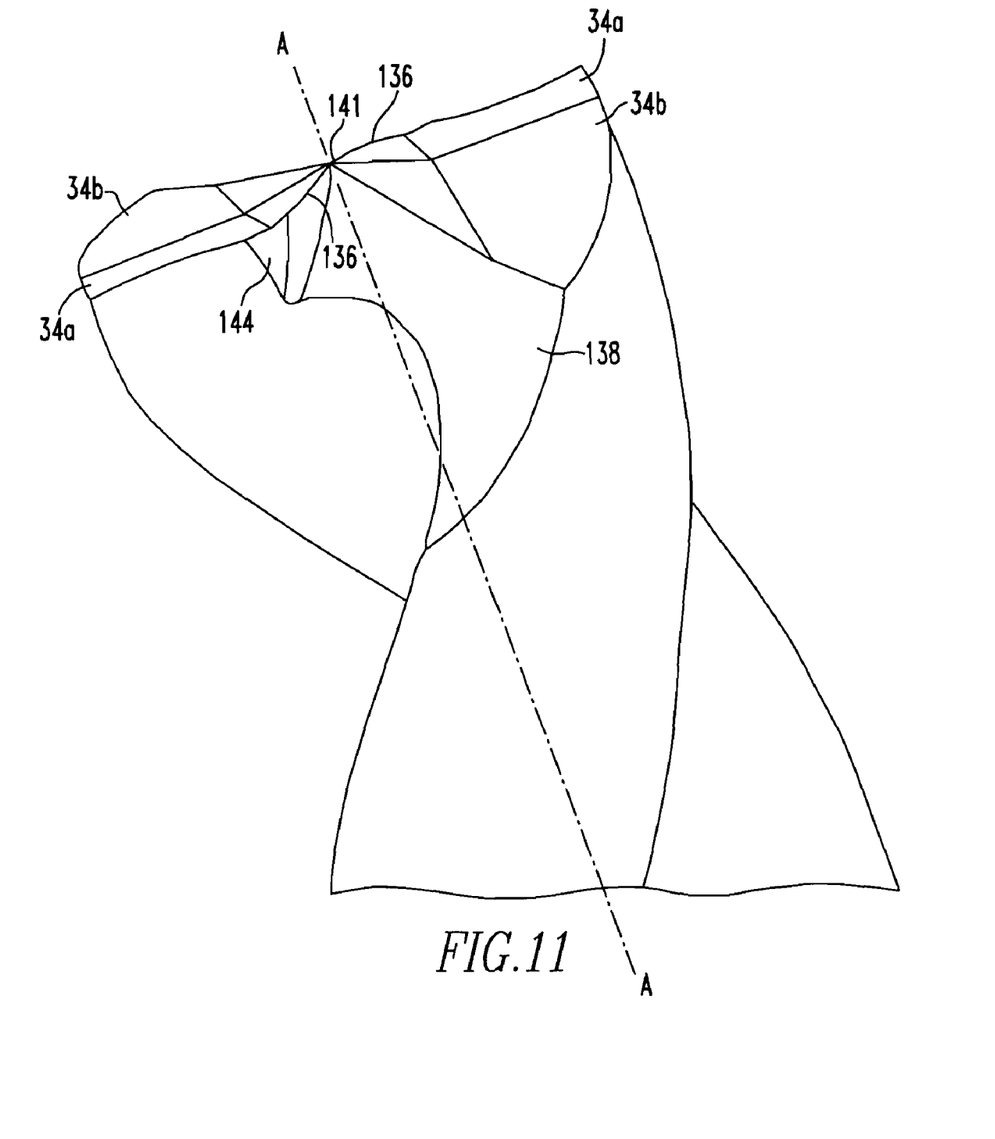
FIG. 11 is another perspective view of the tool illustrated in FIG. 5.
Figure 12:
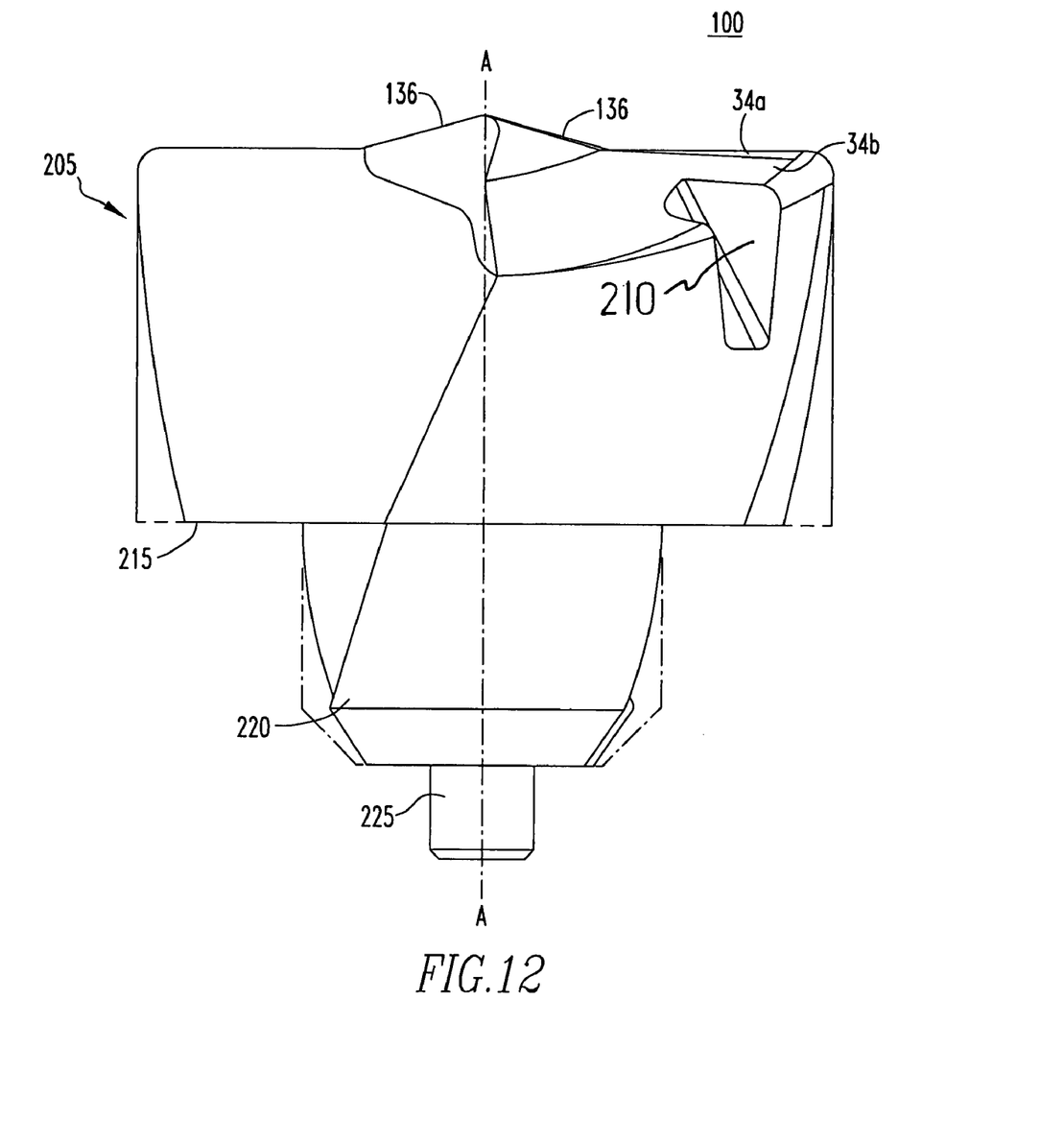
FIG. 12 is a side view of a replaceable drill tip incorporating at least one embodiment of the subject invention.

FIGS. 9-11 add additional clarity to the description of the tool 100. In both embodiments of the tool so far discussed, the tool has been presented as a solid drill. FIG. 12 illustrates a removable drill tip 205 having features identical to that discussed with respect to FIG. 5, with the exception of the tool removal slot 210, which may or may not be included with the subject invention. However, it should be noted that the tool drill tip 205 has a shoulder 215 and a shank 220 with a pilot 225 which are received within mating parts of a drill shank (not shown). Such designs for mating a removable drill tip 205 with the shank of a drill are well known to those skilled in the art, however the Applicants wanted to make clear that the design disclosed herein may be applied to solid drills as well as to removable drill tips 205 used with drill shanks.

As previously discussed, the cutting tool 100 has a chisel edge 141 with first curvilinear cutting edge portions 136 that form a positive rake angle X with the longitudinal axis A-A of the tool 100. A method for producing this positive rake angle X is comprised of producing the first cutting edge portion 136 with at least one pass of a grinding wheel beginning with an initial linear grind from the peak surface 45 in a rearward direction away from the longitudinal axis A-A and continuing into a curvilinear rearward grind direction away from the longitudinal axis A-A of the tool 100 to form the first curvilinear cutting edge portion 136 adjacent to the chisel edge 141 with a positive rake surface. This process is performed with at least one pass of a grinding wheel in a one-step pass of the grinding wheel. Additionally, the at least one pass of the grinding wheel produces both the first thinning surface 138 and the second thinning surface 144.

It is also possible to produce such a cutting tool without the chisel edge having a positive rake surface but with the chisel edge 141 smoothly blended with the first curvilinear edge portion 136 to produce a smooth "s" shape.

The cutting tool 100 described herein produced approximately 38% more holes than a conventional drill lacking these features. In particular, an internally cooled drill rotating at 262 surface feet per minute and fed at 0.005 inches/revolutions into a workpiece of 4340 steel was used to produce a hole diameter of 0.625 inches to a depth of 0.625 inches. This drill produced approximately 4000 holes while a conventional rill produced approximately 2500 holes before failure. Additionally, this drill required less torque and horsepower for operation.

The flat bottom drill of the present invention can be manufactured from materials such as high speed steel HSS, carbide and other materials known in the art to have similar properties of hardness and edge sharpness retention. These base materials can then be coated with hard coating materials such as titanium nitride (TiN), titanium carbonitride (TiCN), and titanium aluminum nitride (TiAlN) to further add hardness and edge retention qualities or other suitable coatings. Various combinations of these or other suitable base materials and coatings can be used to accommodate numerous applications.

The flat bottom cutting drill can be used for forming flat bottom holes in many applications throughout all industries. For instance the drill of the present invention can be used for forming blind bottom holes on a down-the-hole exploration drilling rigs as disclosed in U.S. Pat. No. 3,788,409. The blind bores receive compact buttons made from carbide or some other hard material. The buttons are typically press fit into the blind bottom holes. It is desirable to have a flat bottom hole that cooperates with a flat bottom surface of the compact. The abutment of the flat compact surface with the bottom flat surface of the blind hole limits potential stress concentrations that otherwise might exist on account of contacting surfaces that have irregular shapes. The mating surfaces are subjected to substantial stresses and forces caused by the impact of the buttons against earth material during drilling operations. It is desirable to have a chamfered or rounded edge portion about the circumference of the circular flat bottom.

Other applications, embodiments and variations to the disclosed embodiments described herein will be apparent to those skilled in the art and may be made without departing from the spirit and scope of the invention as defined in the appended claims.

What is claimed is:

1. A generally cylindrical cutting tool for making a flat bottom hole, said tool having a longitudinal central axis, and a cutting end, said cutting end comprising:

a) a first peak surface and a second peak surface intersecting at and generally adjacent to said central axis and forming a chisel edge, wherein a bisector line extends radially through the central axis perpendicular to the chisel edge and defines a first tool half on one side of the bisector line and a second tool half on the other side of the bisector line, and b) wherein each tool half has a first curvilinear cutting edge portion formed by the intersection of a first thinning surface and one peak surface, said first curvilinear cutting edge portion extending radially from said chisel edge, and a second cutting edge portion extending radially outward from said first cutting edge portion wherein the second cutting edge portion is perpendicular to the longitudinal axis, and wherein when viewed from the cutting end, said chisel edge blends to form a smooth transition with said first curvilinear cutting edge portion.

2. The cutting tool according to claim 1, wherein when viewed from the cutting end, the chisel edge blends with the first curvilinear cutting edge portion of the first tool half and the first curvilinear cutting edge portion of the second tool half to provide a continuous "s" shaped connector between each of the first curvilinear cutting edge portions.

3. The cutting tool according to claim 1, wherein the first curvilinear cutting edge portion of each tool half has a positive axial rake angle.

4. The cutting tool according to claim 3, wherein the positive rake angle is identical for each tool half.

5. The cutting tool according to claim 3, wherein the positive rake angle is in the range of approximately 1-15 degrees.

6. The cutting tool according to claim 5, wherein the positive rake angle is approximately 5 degrees.

7. The cutting tool according to claim 1, wherein the first curvilinear cutting edge portions have a radius of curvature between about 8 to 20% of the tool external diameter.

8. A method of producing a helical cutting tool having a longitudinal central axis, wherein the cutting tool has a forward cutting end, and has at least one flute, said cutting end has a top flank, a cutting edge and a chisel edge, said chisel edge formed at the intersection of two sloped peak surfaces adjacent to said central axis, wherein said top flank includes symmetric forward surface sections and rearward surface sections, said cutting edge including a second cutting edge portion and a first cutting edge portion located between said chisel edge and said second cutting edge portion and, wherein the method comprises the step of:

producing said first cutting edge with at least one pass of a grinding wheel beginning with an initial linear grind in the rearward direction continuing into a curvilinear rearward grind directed away from the central axis of the cutting tool, wherein said at least one pass of a grinding wheel produces a first thinning surface and second thinning surface and wherein said at least one pass of a grinding wheel produces a flat and planar second thinning surface oriented at a rearward angle phi with respect to the central axis.

9. The cutting tool according to claim 1, wherein the length of the chisel edge is between 1% and 4% of the external diameter of the cutting tool.

10. The cutting tool according to claim 9, wherein the length of the chisel edge is approximately 2.5% of the external diameter of the cutting tool.

11. A generally cylindrical cutting tool for making a flat bottom hole, said tool having a longitudinal central axis, and a cutting end, said cutting end comprising:

a) a first peak surface and a second peak surface intersecting at and generally adjacent to said central axis and forming a chisel edge, wherein a bisector line extends radially through the central axis perpendicular to the chisel edge and defines a first tool half on one side of the bisector line and a second tool half on the other side of the bisector line, and b) wherein each tool half has a first curvilinear cutting edge portion formed by the intersection of a first thinning surface and one peak surface, said first curvilinear cutting edge portion extending radially from said chisel edge, and a second cutting edge portion extending radially outward from said first cutting edge portion wherein the second cutting edge portion is perpendicular to the longitudinal axis and wherein the first curvilinear cutting edge portion has a positive axial rake.

12. The cutting tool according to claim 11, wherein the positive rake angle is in the range of approximately 1-15 degrees.

13. The cutting tool according to claim 12, wherein the positive rake angle is approximately 5 degrees.

14. The cutting tool according to claim 11, wherein the chisel edge is curved to blend with said first curvilinear cutting edge portion.

15. The cutting tool according to claim 14, wherein when viewed from the cutting end, the chisel edge blends with the first curvilinear cutting edge portion of the first tool half and the first curvilinear cutting edge portion of the second tool half to provide a continuous "s" shaped connector between each of the first curvilinear cutting edge portions.

16. The cutting tool according to claim 11, wherein the first curvilinear cutting edge portions have a radius of curvature between about 8 to 20% of the tool external diameter.

17. The method of producing a helical cutting tool according to claim 8, wherein said at least one pass of a grinding wheel produces a first thinning surface and said first thinning surface is formed with a curvilinear shape.

18. The cutting tool according to claim 11, wherein the length of the chisel edge is between 1% and 4% of the external diameter of the cutting tool.

19. The cutting tool according to claim 18, wherein the length of the chisel edge is approximately 2.5% of the external diameter of the cutting tool.

20. A method of producing a helical cutting tool having a longitudinal central axis, wherein the cutting tool has a forward cutting end and, has at least one flute, said cutting end has a top flank, a cutting edge and a chisel edge, said chisel edge formed at the intersection of two sloped peak surfaces adjacent to said central axis wherein said top flank includes symmetric forward surface sections and rearward surface sections, said cutting edge including a second cutting edge portion and a first cutting edge portion located between said chisel edge and said second cutting edge portion, wherein the cutting edge adjacent to the chisel edge is curved, and wherein the method comprises the step steps of:

producing said first cutting edge portion with at least one pass of a grinding wheel beginning with an initial linear grind in the rearward direction continuing into a curvilinear rearward grind direction away from the central axis of the tool to form a continuous blend between the chisel edge and the adjacent curvilinear cutting edges; and producing said second cutting edge portion perpendicular to the longitudinal axis.

21. The method according to claim 20, wherein said at least one pass of a grinding wheel is a one-step pass of the grinding wheel.

22. The method according to claim 21, wherein said at least one pass of a grinding wheel produces a first thinning surface and a second thinning surface.

23. A method of producing a positive axial rake angle in the drill point of a helical cutting tool having a longitudinal central axis, wherein the cutting tool has a forward cutting end and, has at least one flute, said cutting end has a top flank, a cutting edge and a chisel edge, said chisel edge formed at the intersection of two sloped peak surfaces adjacent to said central axis wherein said top flank includes symmetric forward surface sections and rearward surface sections, said cutting edge including a second cutting edge portion and a first cutting edge portion located between said chisel edge and said second cutting edge portion, wherein the cutting edges adjacent to the chisel edge are curved and the chisel edge forms a positive rake angle with the central axis of the tool, and wherein the method comprises the steps of:

producing said first cutting edge with at least one pass of a grinding wheel beginning with an initial linear grind in the rearward direction continuing into a curvilinear rearward grind direction away from the central axis of the tool to form the chisel edge with a positive rake surface adjacent thereto; and producing said second cutting edge portion perpendicular to the longitudinal axis.

24. The method according to claim 23, wherein said at least one pass of a grinding wheel is a one-step pass of the grinding wheel.

25. The method according to claim 24, wherein said at least one pass of a grinding wheel produces a first thinning surface and a second thinning surface.

26. The method of producing a helical cutting tool according to claim 8, wherein said at least one pass of a grinding wheel produces a curvilinear first thinning surface and said first thinning surface is formed substantially parallel to said central axis.

27. The method of producing a helical cutting tool according to claim 8, wherein said at least one pass of a grinding wheel is a one-step pass of a grinding wheel.

28. The method of producing a helical cutting tool according to claim 8 said angle phi is between 30 and 50 degrees.

* * * * *